United States Patent
Keener

[19]

[11] Patent Number: 5,860,778
[45] Date of Patent: Jan. 19, 1999

[54] TORQUE- AND PRELOAD-CONTROLLED FASTENER AND ASSOCIATED METHOD OF FASTENING

[75] Inventor: Steven Glenn Keener, Trabuco Canyon, Calif.

[73] Assignee: McDonnell Douglas Corporation, St. Louis, Mich.

[21] Appl. No.: 951,897

[22] Filed: Oct. 16, 1997

Related U.S. Application Data

[60] Provisional application No. 60/029,658, Oct. 29, 1996.

[51] Int. Cl.⁶ .............................. F16B 31/00; F16B 35/02
[52] U.S. Cl. .............................. 411/5; 411/263; 411/383; 411/436; 29/428
[58] Field of Search .............................. 411/2, 3, 5, 263, 411/383, 384, 427, 436, 437; 29/428

[56] References Cited

U.S. PATENT DOCUMENTS

| | | |
|---|---|---|
| 268,607 | 12/1882 | Bell . |
| 470,238 | 3/1892 | Goodman . |
| 663,464 | 12/1900 | Prince, Jr. . |
| 995,468 | 6/1911 | Kenney . |
| 1,039,576 | 9/1912 | Mueller et al. . |
| 1,194,792 | 8/1916 | Stewart . |
| 1,267,030 | 5/1918 | Williams . |
| 1,413,024 | 4/1922 | Harrell . |
| 2,060,970 | 11/1936 | Belden . |
| 2,247,499 | 7/1941 | Hutchison . |
| 2,371,595 | 3/1945 | Nield . |
| 2,681,821 | 6/1954 | Medders .................................. 411/263 |
| 2,892,226 | 6/1959 | Bradney . |
| 3,343,443 | 9/1967 | Moore . |
| 3,498,174 | 3/1970 | Schuster et al. ............................ 411/5 |
| 3,595,124 | 7/1971 | Lindstrand et al. . |
| 3,812,757 | 5/1974 | Reiland ...................................... 411/5 |
| 3,937,121 | 2/1976 | Schubert . |
| 4,435,100 | 3/1984 | Cox . |
| 4,662,806 | 5/1987 | Reed . |
| 4,850,771 | 7/1989 | Hurd . |
| 5,018,920 | 5/1991 | Speakman . |
| 5,120,168 | 6/1992 | Padula . |
| 5,228,250 | 7/1993 | Kesselman . |
| 5,275,529 | 1/1994 | Langenbrunner et al. . |
| 5,333,976 | 8/1994 | Dobbrunz . |

OTHER PUBLICATIONS

Drawing No. HL79, *hi–Lok® Collar–Automatic Feed, Standards Committee For Hi–Lok® Products*, Torrance, California, 1 page, 1993, Hi–Shear Corporation.

*Primary Examiner*—Neill Wilson
*Attorney, Agent, or Firm*—Bell Seltzer Intellectual Property Law Group of Alston & Bird LLP

[57] ABSTRACT

A fastener and an associated fastening method are provided to securely join at least two structural elements to form a structural assembly. Although the fastener can join a variety of different types of structural elements, the fastener is particularly well adapted to join composite panels, superplastically-formed/diffusion-bonded panels, honeycomb panels and hollow core panels since the fastener can securely join these structural elements without crushing or otherwise damaging the structural assembly. The fastener can also be mounted in blind installations, while providing a relatively smooth head following installation. In addition, the fastener can securely join structural elements while tolerating variations in the thicknesses of the structural elements.

17 Claims, 2 Drawing Sheets

TORQUE- AND PRELOAD-CONTROLLED FASTENER AND ASSOCIATED METHOD OF FASTENING

RELATED APPLICATIONS

The present application is related and claims priority from U.S. patent application Ser. No. 08/777,970 filed Dec. 24, 1996 and U.S. provisional application Ser. No. 60/029,658 filed Oct. 29, 1996, the contents of both of which are incorporated in their entirety herein.

FIELD OF THE INVENTION

The present invention relates generally to fasteners, and more particularly, to fasteners for joining structures that may be easily damaged by the application of excessive fastening preloads, such as composite structures and hollow metallic structures.

BACKGROUND OF THE INVENTION

Structures requiring high strength-to-weight ratios, such as aircraft and spacecraft wing, tail, and fuselage assemblies, have traditionally been constructed primarily with monolithic metallic materials, such as aluminum-alloy sheets and plates. A current trend is to make such structures from individually designed elements that are engineered to have the required structural properties with reduced weight. Some examples of such individually designed elements include composite materials made of carbon or other fibers in a cured polymeric matrix. For structures subjected to higher temperatures, these individually designed elements include hollow superplastically-formed/diffusion-bonded (SPF/DB) titanium-alloy structures and hollow, metallic honeycomb structures. These structural elements are specifically engineered to take advantage of both the structural characteristics arising from the arrangement of the various components following assembly and also the mechanical and physical properties of the materials that form the various structural elements.

As with more conventional structures, these advanced structural elements must be joined to each other and to other structures to form the resulting assembly, such as an aircraft or spacecraft wing, tail or fuselage assembly. For some low-temperature applications, adhesives can sometimes be used. It has been found to be difficult, however, to join many advanced structures with conventional fasteners since the clamping force applied by the fastener must be carefully limited. For other low-temperature applications as well as high-temperature applications, fasteners such as rivets, bolts, clips, and the like are used to join the various structural elements.

Conventional fasteners usually rely upon the application of compressive preloads to hold the fastened structures together. Advanced structures, such as hollow SPF/DB or honeycomb structures having a porous or low-density structural core sandwiched between face sheets, may be crushed, however, by the application of excessively high compressive fastening preloads, thereby altering the resulting shape of the assembly in a manner that is generally unsuitable for the intended application.

There have been proposed various advanced fasteners for use with the advanced structures to limit the compressive preloads applied by the fastener to the resulting assembly. Although these advanced fasteners have met with varying degrees of success, each of these proposed fasteners have been found to be deficient or limited in some respect.

For example, Hi-Lok type fastener collars have been developed by Hi-Shear Corporation that include torque limiting features for protecting the structural elements from excessive compressive preloads. As known to those skilled in the art, a Hi-Lok type fastener includes a threaded pin that is driven through a pair of aligned holes that have previously been formed in the structural elements to be joined. The pin of the Hi-Lok type fastener is sized to be interference-fit within the holes. A Hi-Lok type fastener also includes a nut or collar installed from the opposite or back side of the resulting assembly. According to some designs, the frangible collar of a Hi-Lok type fastener includes a drive section to which torque is applied to advance the collar upon the threaded end portion of the pin. Upon achieving the prescribed seating torque, the drive section of the collar shears from the remainder of the collar to prevent further torque from being applied to the resulting assembly. As described, however, a Hi-Lok type fastener requires access to the back side of the resulting structure in order to tighten the collar upon the threaded end portion of the pin. In many instances, however, the back side of the resulting structure is blind, that is the back side of the resulting structure will be inaccessible, at least during the latter stages of assembly at which time the fastener is to be installed. As such, a Hi-Lok type fastener is unsuited for the assembly of structural elements having a blind side.

In addition, advanced structures often do not have precisely reproducible thickness due to the processes by which the structures are fabricated, However, the advanced fasteners that are available do not account for the variations in thickness that may be found in such advanced structures. As such, the advanced fasteners must therefore be individually tailored to compensate for the variations in thickness of each one of the structures. As will be readily appreciated, this individual tailoring of the fasteners is a time-consuming, and expensive process.

Therefore, there is a need for an advanced fastener for joining advanced structures that are susceptible to crushing damage in a manner which achieves acceptable fastening performance without damaging the structure. In addition, there is a need for an advanced fastener which can be installed in blind applications and which has a relatively smooth head following installation. There is also need for an advanced fastener that securely joins structural elements which permits variations in the thickness of structural elements.

SUMMARY OF THE INVENTION

A fastener and an associated method of fastening a structural assembly are provided which address many of the deficiencies of conventional fasteners. The fastener is adapted to extend through holes defined by at least two structural elements, thereby securely joining the structural elements to form a structural assembly. Although the fastener can join a variety of different types of structural elements, the fastener is particularly well adapted to join composite panels, superplastically-formed/diffusion-bonded panels, honeycomb panels and hollow core panels since the fastener can securely join these structural elements without crushing or otherwise damaging the structural assembly. The fastener of the present invention can also be mounted in blind installations, while providing a relatively smooth head following installation. In addition, the fastener of certain embodiments of the present invention securely joins structural elements while tolerating variations in the thicknesses of the structural elements.

According to one advantageous embodiment, the fastener includes a sleeve that extends through the holes defined by the structural elements. The sleeve has thread of a first rotational direction at one end thereof. The fastener of this embodiment also includes a threaded pin extending through the sleeve. The pin has a head portion at one end and thread of a second rotational direction at the other end. The fastener of this embodiment further includes a nut engaging both the sleeve and the pin. The nut includes first and second internally threaded sections. The first section of the nut has thread of a second rotational direction to engage the thread of the pin, while the second section of the nut has thread of the first rotational direction to engage the thread of the sleeve.

In order to install the fastener, the sleeve is initially extended through the aligned holes defined by the structural elements. The nut is then advanced onto the threaded end of the sleeve such that the second section of the nut having thread of the first rotational direction engages the thread of the sleeve. Once the nut has threadably engaged the sleeve, the remainder of the installation process can be performed without further access to the rear surface of the structural assembly. Although not necessary for the practice of this embodiment of the present invention, the nut can be aligned with the holes defined by the structural elements and mounted to the rear surface of the structural assembly prior to insertion of the sleeve through the aligned holes to further limit the access to the rear surface of the structural assembly that is required. The pin is thereafter extended through the sleeve. By rotating the pin, the threaded end of the pin engages the threads defined by the first section of the nut. As such, the fastener will securely hold the structural elements between the head portion of the pin and the nut, thereby securely joining these structural elements to form the fastened structural assembly.

In some instances, the thicknesses of the structural elements may vary somewhat. In order to permit the fastener of the present invention to securely join structural elements that vary in thickness, the fastener of one embodiment includes a nut in which at least one of the first and second internal sections also includes an unthreaded portion. As such, the structural elements can vary in thickness by the length of the unthreaded portion, while still permitting the nut to engage both the sleeve and the pin in a manner which permits the fastener to apply the desired compressive preload to the structural assembly. According to one advantageous embodiment, the second section of the nut has unthreaded portions positioned on opposite sides of the thread.

According to another embodiment, the fastener includes a nut that is mounted to a rear surface of a structural assembly while the rear surface of the structural assembly is accessible. Typically, the nut includes a nut plate containing a captive component defining an internally threaded bore. In addition, the fastener preferably includes means, such as screws, rivets, adhesive or the like, for attaching the nut to the rear surface of the structural assembly. While the fastener of this embodiment need not include a sleeve, the fastener does include a threaded pin for extending through the hole defined by the structural assembly and threadably engaging the nut. According to this embodiment, the pin engages the nut without further access to the rear surface of the structural assembly, thereby permitting blind installation of the pin.

According to either embodiment, the threaded pin can include a frangible drive stem frangibly connected to the head portion of the pin such that rotation of the frangible drive stem advances the pin relative to the nut without further access to the rear surface of the structural assembly. The frangible drive stem is constructed so as to fail upon application of a nominal predetermined installation torque. As such, the compressive preload applied by the fastener to the structural assembly can be limited, thereby preventing the fastener from crushing or otherwise damaging the structural assembly. In addition, the fastener of this embodiment permits the compressive preload applied by the fastener to be more precisely controlled, thereby reducing process variations. The frangible drive stem preferably includes a drive stem and a frangible drive stem interface interconnecting the drive stem and the head portion of the pin. Although the frangible drive stem and the pin are preferably integral, the frangible drive stem interface is preferably constructed to fracture from the head portion upon application of the predetermined installation torque such that the resulting head portion of the pin has a smooth surface.

In order to position the smooth surface of the head portion of the pin flush with the front surface of the structural assembly, the head portion of the pin is preferably tapered and the end of the sleeve opposite the end having thread is preferably flared. Correspondingly, the portion of the hole opening through the outer surface of the structural assembly can define a recess, such as a countersink or a counterbore, for snugly receiving the tapered head portion of the pin and the flared end of the sleeve. The structural assembly can therefore be securely fastened by one or more fasteners which do not protrude beyond the outer surface of the structural assembly. As such, the fastener of the present invention will not disrupt the aerodynamic performance of an aircraft or other vehicle incorporating the fastened structural assembly.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to the like elements throughout.

Figure 1:
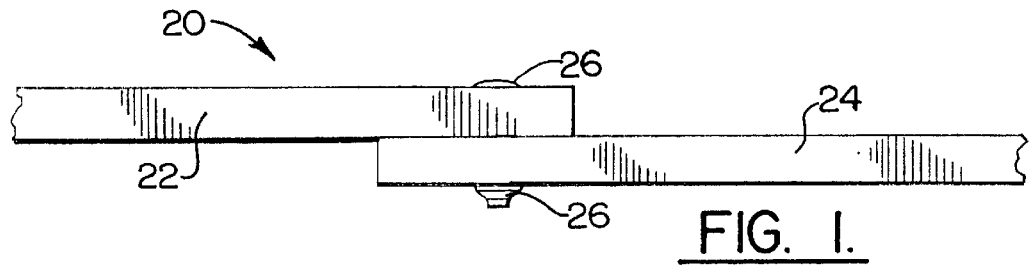
FIG. 1 is an elevational or side view of a fastened structural assembly according to one embodiment of the present invention.

As shown in FIG. 1, a fastened structural assembly 20 includes a first structural element or panel 22, a second structural element or panel 24, and a fastener 26 that fastens the first structural element to the second structural element. Although the structural assembly of FIG. 1 includes only two structural elements, the structural assembly can include additional structural elements or other types of structural elements, if so desired. The first and second structural elements may be formed of any materials. However, the fastener 26 of the present invention is particularly useful for joining structural elements wherein at least one structural element either is susceptible to damage if excessive compressive fastening preloads are applied during assembly, and/or is subject to variations in thickness from a nominal thickness. Examples of such structural elements include, but are not limited to, composite panels, superplastically-formed/diffusion-bonded (SPF/DB) panels, honeycomb panels, and other hollow-core or other low-density panels.

Figure 2:
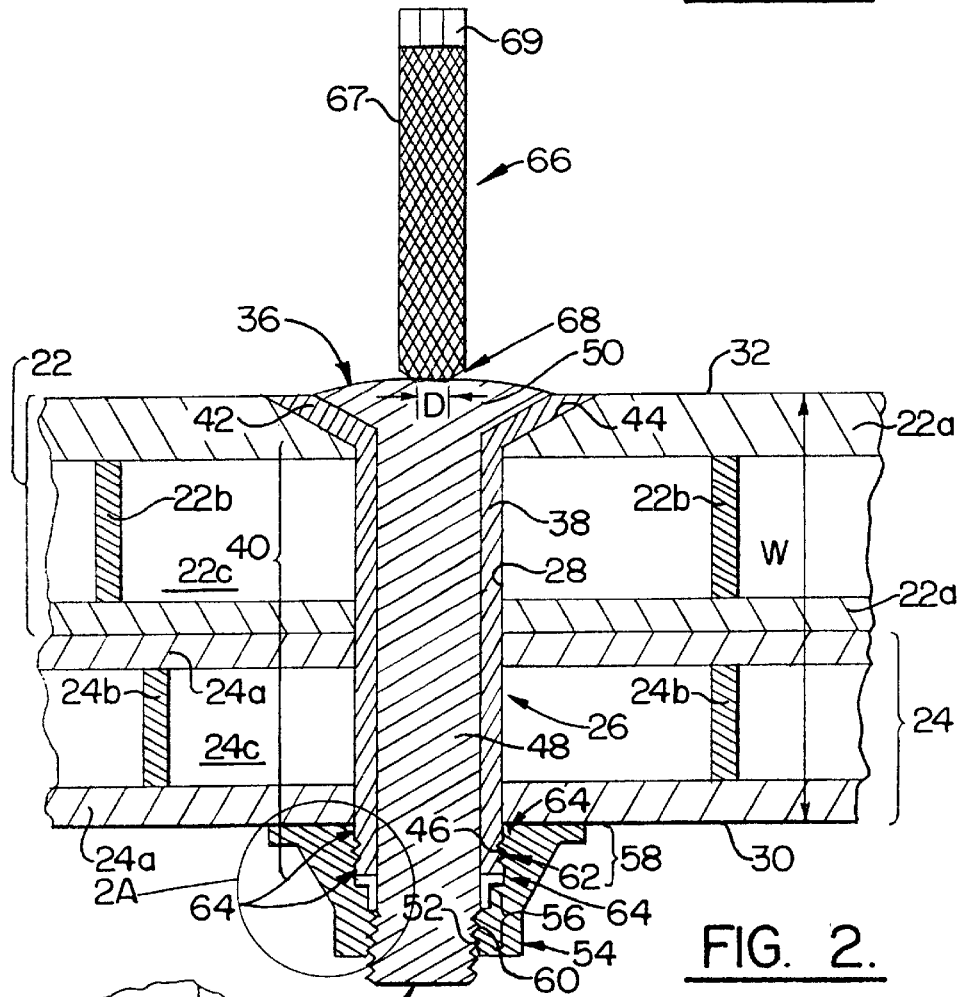
FIG. 2 is a cross-sectional view of a portion of a fastened structural assembly including a fastener according to one advantageous embodiment of the present invention.

FIG. 2 illustrates a portion of the fastened structural assembly 20 in greater detail. As shown, the structural assembly includes a pair of structural elements or panels, each of which is illustratively depicted to have a pair of face sheets 22a, 24a separated by a number of ribs 22b, 24b that extend through an otherwise hollow core 22c, 24c. As will be apparent, however, the structural assembly can include other types of structural elements without departing from the spirit and scope of the present invention. The structural assembly has an overall stackup thickness W and a hole 28 extending therethrough. The structural assembly is described as having a first or rear side 30 and a second or front side 32. For reference purposes, the fastener 26 is described as having a first end 34 adjacent to the first side of the structural assembly and a second end 36 adjacent to the second side of the structural assembly.

The fastener 26 of one advantageous embodiment includes a sleeve 38 which has a length greater than the thickness W of the structural assembly 20. The sleeve is preferably cylindrically symmetric, with a cylindrical portion 40 and an outwardly flared or tapered portion 42 adjacent to the second end 36. The outer diameter of the cylindrical portion of the sleeve is preferably approximately equal to or slightly less than the diameter of the bore 28 such that the sleeve can be inserted through the bore with either a net- or clearance-fit. As shown in FIG. 2, the portion of the bore opening through the second or front side 32 of the structural assembly is preferably countersunk or counterbored. The outwardly flared portion of the sleeve is therefore shaped and sized to fit within the countersink 44. The first end of the sleeve is also externally threaded. As described below, the thread 46 at the first end of the fastener preferably has a first rotational direction.

The fastener 26 also includes a threaded pin 48 having a length greater than that of the sleeve 38. The pin is generally cylindrically symmetric with a cylindrical shank portion having a diameter that is slightly larger than the inner diameter of the sleeve. In one advantageous embodiment, the diameter of the cylindrical shank portion is between 0.001 and 0.003 inch larger than the inner diameter of the sleeve. As such, the pin generally has a surface coating, such as a coating of Hi-Kote 1 lubricant developed by Hi-Shear Corporation, to provide improved lubricity and drive force reduction in order to permit the pin to be inserted through the sleeve. The second end 36 of the pin also has a head portion 50 that is tapered on the underside with the proper shape and dimensions to be received within the flared portion 42 of the sleeve. As such, the head portion 50 of the pin is effectively countersunk into the flared portion of the sleeve and, in turn, into the face of the second side 32 of the structural assembly 20. As will be apparent, the fastened structural assembly is usually arranged such that the second side is the outwardly facing side such that the countersinking of the sleeve and the pin into the face of the second side provides a flush external face, thereby producing an aerodynamically desirable surface as well as a surface with an unobtrusive aesthetic appearance.

The first end 34 of the pin 48, opposite the second end 36 containing the head portion 50, is also externally threaded. In particular, the thread 52 at the first end of the fastener preferably has a second rotational direction that is opposite the rotational direction of the sleeve thread 46. As used herein, the term "rotational direction" or "sense" of a thread relates to whether it is a left-hand thread or a right-hand thread. As such, either the sleeve thread or the pin thread is a left-handed thread, while the other thread is a right-hand thread. In one embodiment, the sleeve thread is a left-hand thread and the pin thread is a right-hand thread, in conformance with the accepted convention for thread-sense designations. The pitch of the pin thread and the sleeve thread may be the same or different without departing from the spirit and scope of the present invention.

The fastener 26 also includes a nut 54 having a stepped inner diameter to thereby define a first internally threaded section 56 and a second internally threaded section 58. The first section preferably has a cylindrical inner diameter and includes thread 60 of the second rotational direction. As such, the thread of the first section can threadably engage the external pin thread 52. Likewise, the second section preferably has a cylindrical inner diameter that generally is slightly larger than the inner diameter of the first section. The second section also includes thread 62 of the first rotational direction so as to threadably engage the external sleeve thread 46.

Figure 2A:
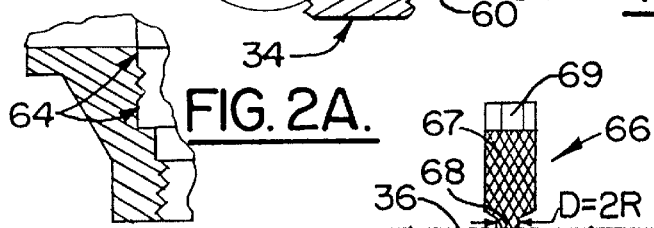
FIG. 2A is a fragmentary cross-sectional view of a portion of the nut illustrated in FIG. 2 which depicts the second section of the nut, including the unthreaded portions, in more detail.

At least one of the first and second internal sections 56, 58 preferably includes an unthreaded portion 64. Advantageously, the second section preferably includes an unthreaded portion and, more preferably, includes an unthreaded portion on each side of the internal thread 62. See FIG. 2A. By including unthreaded portions, a nut of this embodiment can accommodate variations in the stackup thickness W of the structural assembly 20, while still permitting the thread of the second section to engage the sleeve thread 46 in order to apply the desired compressive preload.

Although the nut 54 could be designed to accommodate relatively large variations in the thickness W of the structural assembly 20 by having larger unthreaded portions, the nut of one advantageous embodiment is designed to accommodate the relatively minor variations that are permitted within normal tolerances of the fabricated or machined components of the fastened structural assemblies. For example, fastened structural panels fabricated according to conventional techniques generally permit a total maximum variation in thickness of about 0.060 inch. As such, the nut preferably includes a second portion having unthreaded portions on the opposite sides of the thread that are each approximately 1/32 inch in length in order to accommodate a total variation of 0.060 inch or less in the thickness of the fastened structural panel, while continuing to apply the desired compressive preload to the structural assembly.

Although the head portion 50 of the pin 48 could include recesses, slots or other engagement features for rotatably advancing the pin, the fastener 26 preferably includes a frangible drive stem 66 that extends outwardly from the head portion of the pin in a direction generally parallel to the longitudinal axis of the pin. The frangible drive stem preferably includes a drive stem 67 and a frangible drive stem interface 68 that interconnects the drive stem and the head portion of the pin. Although not necessary for the practice of the present invention, the drive stem 67, the frangible drive stem interface 68 and the pin are all fabricated together as a single integral unit of a material, such as steel, aluminum alloy or titanium alloy.

The drive stem 67 preferably has an engagement portion 69 at the end of the drive stem opposite the head portion 40 of the pin 48. The engagement portion can take a number of forms, such as a hexagonal portion, opposing flats, knurled surfaces or the like, which permit torque to be applied to the pin through the drive stem, such as by means of a wrench, ratchet gun or other drive tool.

As torque is applied to the drive stem 67 in order to rotate the pin 48, the frangible drive stem interface 68 determines the maximum allowable torque based upon the cross-sectional area of the frangible drive stem interface and the material properties of the frangible drive stem interface. When the torque exceeds the maximum allowable torque that may be carried by the frangible drive stem interface, the interface fails in shear overload, thereby detaching the drive stem from the head portion 50 of the pin so as to leave a smooth surface. The frangible drive stem interface is preferably a tapered cylindrical region that tapers to its smallest diameter D immediately adjacent the head portion of the pin. The smallest diameter D is selected such that the frangible drive stem interface will fracture at the top of the head portion upon the application of a preselected nominal design torque T (the maximum allowable torque) to the engagement portion 69 of the drive stem.

Once the nominal design torque T is selected as described below, the diameter D of the frangible drive stem interface 68 that will fracture at the nominal design torque T may be accurately determined based upon the actual material properties of the pin 48 and the frangible drive stem 66 by applying known strength-of-materials principles and formulas. In this regard, the minimum shear strength $\tau$ of a material is related to the minimum torque T that may be applied through a cylindrical region, such as the frangible drive stem interface, by the relationship $\tau = 2T/\pi R^3$, wherein $R = D/2$. For a pin and frangible drive stem fabricated from a material, such as steel, having a known shear strength $\tau$, $R = (2T/\pi\tau)^{1/3}$.

The nominal design torque T is selected based upon several considerations, as described below. In particular, the nominal design torque T is preferably selected by the designer so as not to exceed the allowable compressive preload on the structural assembly 20 as the pin 48 is threaded into the nut 54. In addition, the nominal design torque T is preferably selected to be slightly larger, such as about 5% larger, than the minimum torque value that is required to produce a failure at the actual shear strength of the fastener material determined through testing. Consequently, the selection of the nominal design torque T depends upon the nature of the structural assembly and the actual material properties of the pin. However, the frangible drive stem 66 of the fastener 26 of the present invention allows the nominal design torque T to be appropriately selected for any combination of structures and material properties of the frangible drive stem interface 68, as described below.

For one typical case wherein $\tau$ is 95,000 pounds per square inch minimum for a conventional titanium fastener pin material and the nominal design torque T is 90 in-lb, the radius R of the frangible drive stem interface 68 is determined to be about 0.0845 inch minimum. Thus, the diameter D of the frangible drive stem interface would be 2R or 0.169 inch minimum. The diameter D may be fine-tuned and adjusted upwards by 5% to obtain nominal design values. In addition, the diameter D will vary for pins 48 and frangible drive stems 66 that are formed of other lots or types of materials or for applications that require other levels of preload necessitating other levels of torque.

Additionally, the materials from which the sleeve 38, pin 48 and nut 54 of the fastener 26 are formed are chosen to be compatible with the structural assembly 20 to be fastened. In one advantageous embodiment in which the structural assembly is formed of SPF/DB panels that are made of the titanium alloy Ti-6Al-4V, the sleeve is made of 300 series stainless steel, the pin is made of titanium alloy Ti-6Al-4V, and nut is made of A286 stainless steel alloy.

Figure 3:
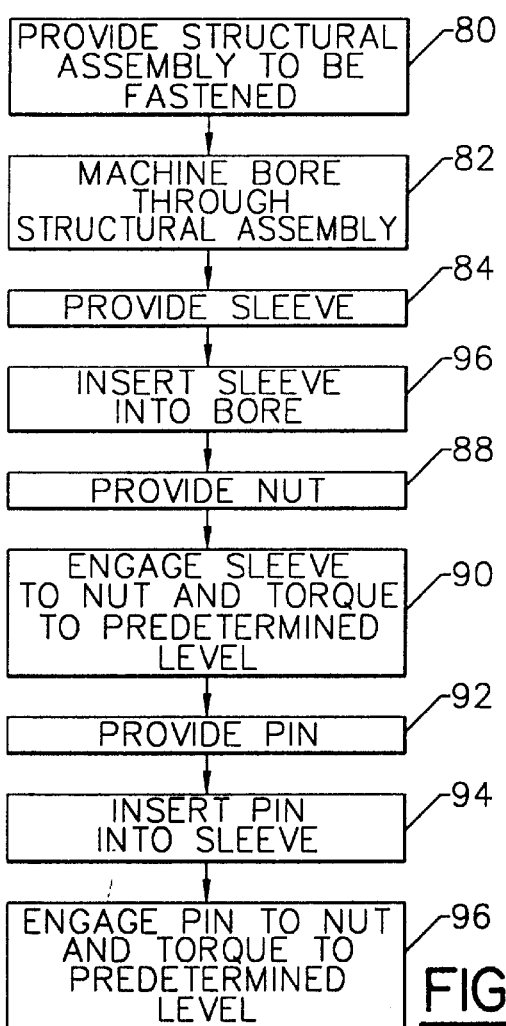
FIG. 3 is a block diagram illustrating operations performed to install the fastener of FIG. 2.

FIG. 3 depicts the operations performed to install the fastener 26 of FIG. 2. As shown in blocks 80 and 82, a structural assembly 20, typically comprised of two or more structural elements or panels, is provided and a hole 28 is machined therethrough, typically by drilling and then reaming to establish the size of the hole and to remove burrs. The sleeve 38 is then provided and inserted into the hole with a clearance- or net-fit. See blocks 84 and 86. The nut 54 is provided and is threadably advanced upon the sleeve to a predetermined torque load by threadably engaging the thread of the second section 58 of nut and the sleeve thread 46. See blocks 88 and 90. Although not necessary for the practice of this embodiment of the present invention, the nut can be aligned with the hole machined through the structural elements and mounted to the rear surface of the structural assembly prior to insertion of the sleeve through the hole to further limit the access to the rear surface of the structural assembly that is required. In any event, once the nut is installed, torqued and properly seated, no further access to the first or rear side 30, which is typically the inside, of the structural assembly 20 is required. Instead, the remaining steps of the installation procedure can be performed from the second or front side 32, which is usually the outside, of the structural assembly.

The installation of the nut 54 by the application of torque establishes the maximum compressive preload that the fastener 26 applies to the structural assembly 20. As such, the compressive preload applied by the fastener to the structural assembly can be limited, thereby preventing the fastener from crushing or otherwise damaging the structural assembly. In addition, the fastener of this embodiment permits the compressive preload applied by the fastener to be more precisely controlled, thereby reducing process variations which insures the proper level of fatigue resistance and durability.

As described above, the unthreaded regions 64 of the nut 54 allow the nut to be threaded onto the sleeve 38 by different amounts to accommodate variations in the stackup thickness W of the assembled structure, while still applying the desired fastener compressive preload to the structural assembly 20. The fastener 26 generally accommodates relatively minor variations in the stackup thickness by providing a nut with unthreaded portions. As described below, however, larger variations in thickness are generally accommodated by providing a set of nuts that is stocked at the site of installation of the fasteners. The total lengths of the unthreaded regions 64 of the various nuts of the set are preferably different. As such, if it were found during installation of a fastener that the variation in thickness W for a particular structural assembly were so large that one nut could not engage the sleeve thread 46 and be torqued as desired, a different nut with a larger unthreaded region would be selected from the stock and used without removing the sleeve. As such, much larger variations in thickness can be readily accommodated.

Once the nut 54 has threadably engaged the sleeve 38, the pin 48 is provided and inserted into the sleeve, as shown in blocks 92 and 94. Preferably, the sleeve has a relatively thin wall, such as about 0.060 inch, and the pin is dimensioned to have a diameter that is slightly larger, preferably between 0.001 inch and 0.003 inch larger, than the inner diameter of the sleeve such that the pin is inserted into the sleeve with an interference- or slightly oversized-fit. As the pin is inserted through the sleeve, the sleeve expands radially outward so as to establish tight contact with the hole 28 of the structural assembly 20. As described above, the pin preferably has a surface coating to provide improved lubricity and drive force reduction in order to permit the pin to be inserted through the sleeve. By way of example, the pin of one embodiment can be coated with Hi-Kote 1 lubricant or the like to reduce the drive in force by about 20% in comparison to an uncoated pin. As such, the pin can be threadably advanced into the nut without adversely affecting the prior engagement of the nut upon the sleeve. This tight fit of the pin within the sleeve and the tight fit of the sleeve within the hole, in combination with the engagement of the nut on the sleeve, produces a tight engagement between the sleeve and the structural assembly, thereby greatly enhancing the structural integrity of the joint. The enhanced integrity manifests itself in several ways, such as improved fatigue life and structural durability.

Although less preferred than a pin 48 that is inserted into the sleeve 38 with an interference- or slightly oversized-fit, the pin and sleeve can be sized such that the pin is inserted into the sleeve with a clearance- or net-fit without departing from the spirit and scope of the present invention. However, the fatigue life of a fastener 26 that includes a pin that is inserted into a sleeve with a clearance- or net-fit will probably be diminished in comparison to a fastener that includes a pin that is inserted into a sleeve with an interference- or slightly oversized-fit.

As the pin 48 nears the full extent of its insertion into the sleeve 38 according to either embodiment, the first end 34 of the pin engages the nut 54. The pin is then rotated about its cylindrical axis so that the pin thread 52 engages thread 60 of the first section 56 of the nut as shown in block 96. While the pin can be rotated by a variety of tools, a drive stem having a hexagonal end is preferably rotated by means of a hexagonal wrench or other drive tool. The pin is rotated until the desired torque is reached. In one preferred embodiment in which the pin is rotated by means of a frangible drive stem 66 extending outwardly from the head portion 50 of the pin, the maximum torque carried by the frangible drive stem is determined by the shear-overload fracturing of the frangible drive stem interface 68 once the nominal design torque T is reached. However, the pin could be rotated by other means, such as a screwdriver or torque wrench that engages a drive recess defined by the head portion of the pin or a hexagonal head that extends upwardly from the head portion of the pin, respectively. Since a hexagonal head, slot, or other protruding or recessed engagement feature leaves the head portion of the pin with an outwardly visible feature, such features are not preferred on external vehicle surfaces since they may interfere with the aerodynamics of an aircraft or other vehicle that incorporates the structural assembly.

Figure 4:
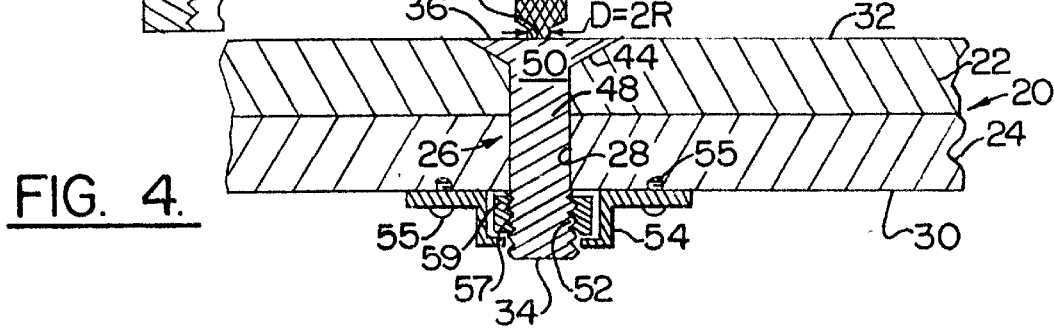
FIG. 4 is a cross-sectional view of the fastened structural assembly including a fastener of another embodiment to the present invention wherein the fastener includes a frangible drive stem.
Figure 5:
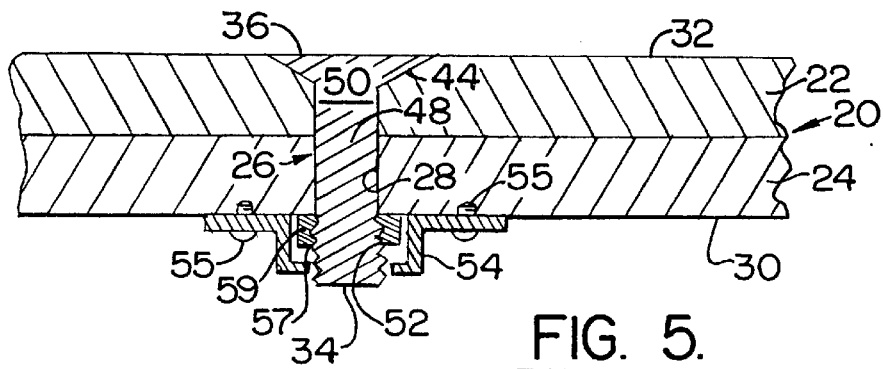
FIG. 5 is a cross-sectional view of the fastened structural assembly of FIG. 4 following fracturing of the frangible drive stem from the head portion of the pin.

Another embodiment of the fastener 26 of the present invention is illustrated in FIGS. 4 and 5. According to this embodiment, the fastener again includes a pin 48 having external threads 52 at one end. Generally, however, the pin of this embodiment does not necessarily require a sleeve. Instead, the pin is preferably sized to fit through the aligned holes 28 of the structural elements 22, 24 with a close tolerance to thereby produce either a net-fit condition such that the pin can be rotated within the hole. Alternatively, the pin can be coated with a lubricant, such as Hi-Kote 1 lubricant or the like, and fit through the aligned holes with an interference-fit to provide improved fatigue resistance. As described above and as shown in FIG. 4, the fastener also preferably includes a frangible drive stem 66 having a drive stem 67 and a frangible drive stem interface 68 interconnecting the drive stem and the head portion 50 of the pin.

The fastener 26 of this embodiment also includes a nut and, more preferably, a nut plate 54 as well as means for mounting the nut plate to the first or rear side 32 of the structural assembly 20. In the illustrated embodiment, the mounting means includes screws 55. However, the mounting means can instead include rivets, adhesive or the like. The nut plate may take the form of a conventionally-shaped, threaded nut or any other desired shape. However, the nut plate is preferably large enough to spread the compressive preload applied by the fastener over a relatively large area on the first side of the structural assembly 20. As shown, the nut plate preferably includes a captive component 59 that has an internally threaded bore 57 generally aligned with the hole 28 through the structural assembly. As known to those skilled in the art, the captive component of a nut plate can float relative to the remainder of the nut plate, thereby permitting the internally threaded bore defined by the nut plate to accommodate slight misalignments with respect to the hole in the structural assembly. Thus, as the pin 48 is inserted through the hole in the structural assembly, the external threads 52 of the pin can engage the internally threaded bore defined by the captive component of the nut plate in order to securely join the structural elements.

Figure 6:
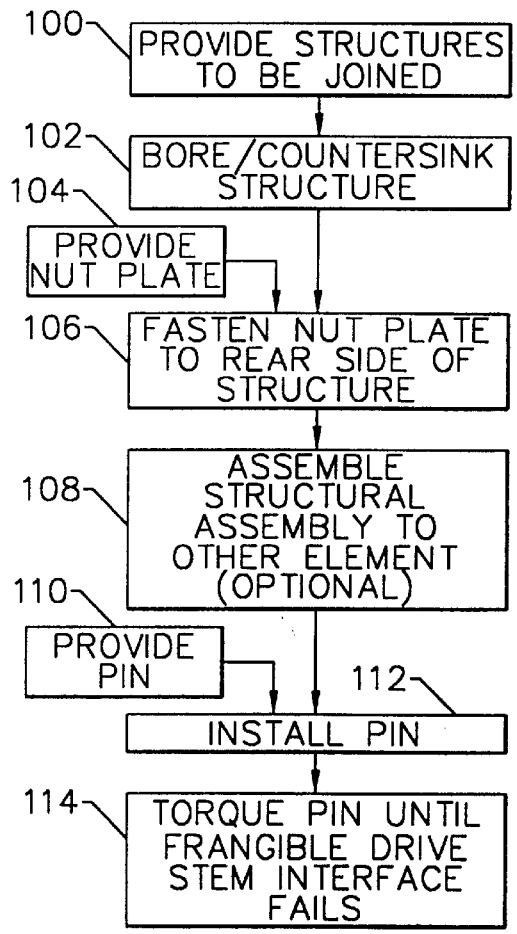
FIG. 6 is a block diagram illustrating operations performed to install the fastener of FIGS. 4 and 5.

FIG. 6 illustrates the operations performed to install the fastener 26 of the embodiment of FIGS. 4 and 5. Once a structural assembly 20 is provided, such as the two structural elements or panels of FIGS. 4 and 5, a hole 28 is formed through the structural assembly, as shown in blocks 100 and 102. The nut plate 54 is then provided and mounted to the first or rear side 32 of the structural assembly, such as by means of two or more screws 55. See blocks 104 and 106. The structural assembly is typically, but not necessarily, thereafter assembled into some larger element, such as a supporting structure. See block 108. Even though the first or rear side of the structural assembly is generally no longer accessible once the structural assembly is assembled into a larger element, the installation of the fastener of the present invention can still be completed.

In this regard, a pin 48 including a frangible drive stem 66 is then provided as shown in block 110. The threaded pin 38 is then inserted into the hole 28 such that the tapered underside of the head portion 50 is received into the countersink 44 for a flush fit. The threaded pin engages the nut plate 54 by rotating the drive stem 67, such as with a wrench applied to the engagement portion 69, such that the external threads 50 of the pin engage the internally threaded bore 57 defined by the captive component 59 of the nut plate, as shown in block 112. Once the maximum permissible torque for the threaded pin is reached, the frangible drive stem interface 68 fails in shear according to and determined by the strength-of-materials principles discussed previously. See block 114.

The shear failure of the frangible drive stem interface 68 preferably occurs at the exact location at which the frangible drive stem interface joins the head portion 50 of the pin 48, thereby leaving the head portion of the pin with a smooth external surface, as shown in FIG. 5. If the shear failure of the frangible drive stem interface does not occur at the exact location at which the frangible drive stem interface joins the head portion of the pin, the head portion can be smoothed using an abrasive media, such scotch-brite or the like. This smooth external surface is particularly important for applications such as fasteners 26 installed in the external skin of high-speed aircraft, in which any irregularity can disrupt the aerodynamics established by the external skin of the aircraft. As will be apparent, conventional fasteners with either recesses or protruding drive features, such as screwdriver or hexagonal-drive engagement features, can produce undesirable aerodynamic affects.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are not used in a generic and descriptive sense only and not for purposes of limitation.

That which is claimed:

1. A fastened structural assembly comprising:
    at least two structural elements, each structural element defining a hole therethrough, said structural elements being aligned such that the respective holes are aligned; and
    a fastener extending through the aligned holes defined by said structural elements to thereby form the structural assembly, said fastener comprising:
        a sleeve extending through the aligned holes defined by said structural elements, said sleeve having thread of a first rotational direction at one end thereof;
        a pin extending through said sleeve, said pin having a head portion at one end and thread of a second rotational direction at the other end thereof;
        a nut engaging both said sleeve and said pin, said nut defining first and second internal sections, the first section of said nut having thread of a second rotational direction to engage the thread of said pin, the second section of said nut having thread of a first rotational direction to engage the thread of said sleeve; and
        a frangible drive stem frangibly connected to the head portion of said pin such that rotation of said frangible drive stem can advance said pin relative to said nut, wherein said frangible drive stem is constructed so as to fail upon application of a predetermined installation torque such that a compressive preload applied by the fastener to the structural assembly can be limited and controlled,
    wherein said fastener securely holds said structural elements between the head portion of said pin and said nut.

2. A fastened structural assembly according to claim 1 wherein at least one of the first and second internal sections of said nut also includes an unthreaded portion to permit the fastener to securely join structural elements that vary in thickness.

3. A fastened structural assembly according to claim 1 wherein the head portion of said pin is tapered and the end of said sleeve opposite the end having thread is flared, and wherein at least one of said structural elements defines a recess selected from the group consisting of a countersink and a counterbore for receiving the tapered head portion of said pin and the flared end of said sleeve.

4. A method of fastening a structural assembly comprising the steps of:
    aligning at least two structural elements, wherein each structural element defines a hole therethrough, and wherein said aligning step comprises aligning the structural elements such that the respective holes are aligned;
    mounting a nut to a rear surface of one of the structural elements such that the nut is aligned with the respective holes defined by the structural elements; and
    installing a fastener through the aligned holes defined by the structural elements, following said mounting step, to thereby form the structural assembly, wherein said step of installing the fastener through the aligned holes comprises:
        extending a sleeve through the aligned holes defined by the structural elements, wherein the sleeve has thread of a first rotational direction at one end thereof;
        engaging the sleeve with the nut, wherein the nut defines a first internal section having thread of a second rotational direction and a second internal section having thread of a first direction, and wherein said step of engaging the sleeve with the nut comprises threadably engaging the sleeve with the second internal section of the nut;
        extending a pin through the sleeve, wherein the pin has a head portion at one end and thread of a second rotational direction at the other end thereof; and
        engaging the pin with the nut, wherein said step of engaging the pin with the nut comprises threadably engaging the pin with the first internal section of the nut such that the fastener securely holds the structural elements between the head portion of the pin and the nut.

5. A method according to claim 4 wherein said step of engaging the pin with the nut comprises rotating a frangible drive stem frangibly connected to the head portion of the pin to thereby advance the pin relative to the nut.

6. A method according to claim 5 further comprising the step of limiting and controlling a compressive preload applied by the fastener to the structural assembly by constructing the frangible drive stem to fail upon application of a predetermined installation torque.

7. A fastener for securely joining at least two structural elements to form a structural assembly, the fastener comprising:
    a sleeve having thread of a first rotational direction at one end thereof;
    a pin for extending through said sleeve, said pin having a head portion at one end and thread of a second rotational direction at the other end thereof; and
    a nut for engaging both said sleeve and said pin, said nut defining first and second internal sections, the first internal section of said nut having thread of a second rotational direction to engage the thread of said pin, the second internal section of said nut having thread of a first rotational direction to engage the thread of said sleeve,
    wherein at least one of the first and second internal sections of said nut also includes an unthreaded portion to permit the fastener to securely join structural elements that vary in thickness.

8. A fastener according to claim 7 wherein the second internal section of the nut includes unthreaded portions on opposite sides of the thread.

9. A fastener according to claim 7 further comprising a frangible drive stem frangibly connected to the head portion of said pin such that rotation of said frangible drive stem can advance said pin relative to said nut, wherein said frangible drive stem is constructed so as to fail upon application of a predetermined installation torque such that a compressive preload applied by the fastener to the structural assembly can be limited and controlled.

10. A fastener according to claim 7 wherein the head portion of said pin is tapered and the end of said sleeve opposite the end having thread is flared, and wherein at least one of said structural elements defines a recess selected from the group consisting of a countersink and a counterbore for receiving the tapered head portion of said pin and the flared end of said sleeve.

11. A fastener for joining a structural assembly according to an assembly procedure in which final assembly steps are performed without access to a rear surface of the structural assembly, the fastener comprising:

a nut for mounting to the rear surface of the structural assembly while the rear surface of the structural assembly is accessible;

a pin for extending through a hole defined by the structural assembly and threadably engaging said nut without further access to the rear surface of the structural assembly, wherein said pin has a head portion at one end and a threaded portion at the other end thereof; and a frangible drive stem frangibly connected to the head portion of said pin such that rotation of said frangible drive stem can advance said pin relative to said nut without further access to the rear surface of the structural assembly, wherein said frangible drive stem is constructed so as to fail upon application of a predetermined installation torque such that a compressive preload applied by the fastener to the structural assembly can be limited and controlled, and wherein said frangible drive stem is constructed in a manner that failure of said frangible drive stem separates said frangible drive stem from the head portion of said pin such that the head portion has a smooth surface proximate a front surface of the structural assembly.

12. A fastener according to claim 11 wherein said frangible drive stem comprises a drive stem and a frangible drive stem interface interconnecting the drive stem and the head portion of said pin, wherein said frangible drive stem interface is constructed so as to fail upon application of the predetermined installation torque such that the compressive preload applied by the fastener to the structural assembly can be limited and controlled.

13. A fastener according to claim 11 wherein said frangible drive stem and said pin are integral.

14. A fastener according to claim 11 wherein said nut comprises a nut plate containing a captive component defining an internally threaded bore, and wherein the fastener further comprises means for attaching said nut plate to the rear surface of the structural assembly.

15. A fastener according to claim 11 wherein said attaching means is selected from the group consisting of screws, rivets and adhesive.

16. A method for joining a structural assembly with a fastener according to an assembly procedure in which final assembly steps are performed without access to a rear surface of the structural assembly, the method comprising the steps of:

mounting a nut to the rear surface of the structural assembly while the rear surface of the structural assembly is accessible;

extending a pin through a hole defined by the structural assembly, wherein the pin has a head portion at one end and a threaded portion at the other end thereof;

rotating a frangible drive stem that is frangibly connected to the head portion of the pin such that the pin threadably engages the nut without further access to the rear surface of the structural assembly; and limiting and controlling a compressive preload applied by the fastener to the structural assembly by constructing the frangible drive stem to fail upon application of a predetermined installation torque, wherein said limiting and controlling step comprises fracturing the frangible drive stem from the head portion of the pin such that the head portion has a smooth surface proximate a front surface of the structural assembly.

17. A method according to claim 16 further comprising a step of providing a structural assembly comprised of structural elements selected from the group consisting of composite panels, superplastically-formed/diffusion-bonded panels, honeycomb panels and hollow core panels.

\* \* \* \* \*

UNITED STATES PATENT AND TRADEMARK OFFICE
CERTIFICATE OF CORRECTION

PATENT NO. : 5,860,778
DATED : January 19, 1999
INVENTOR(S) : Keener It is certified that error appears in the above-identified patent and that said Letters Patent is hereby corrected as shown below:

On the title page, item [73],

In the Assignee's address, "Mich." should read --Mo.--.

In the Related U.S. Application Data, Item [60], before the reference to the Provisional Application, add --U.S. Application Number 08/777,970, Filed December 24, 1996, and--.

Signed and Sealed this

Eighteenth Day of May, 1999

Q. TODD DICKINSON

*Attest:*

*Attesting Officer*       Acting Commissioner of Patents and Trademarks